July 11, 1933. W. M. FAIRBAIRN 1,917,831
MACHINE TOOL
Filed July 24, 1930
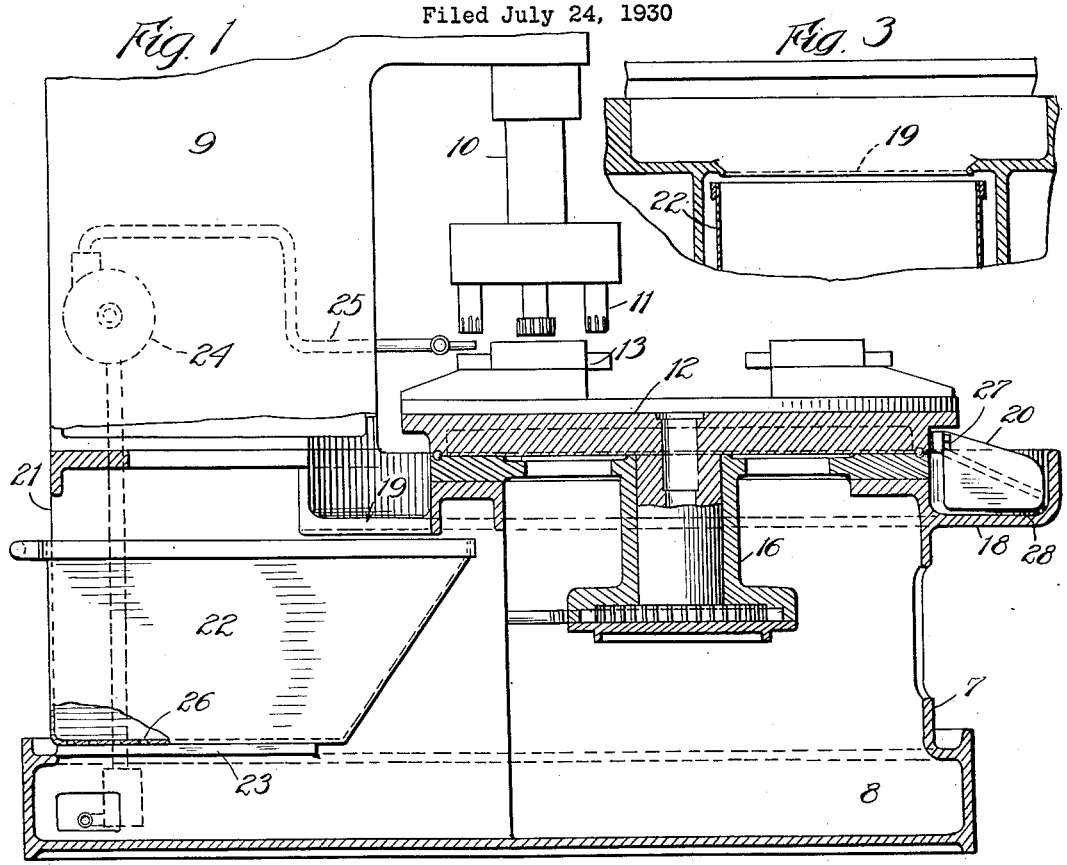
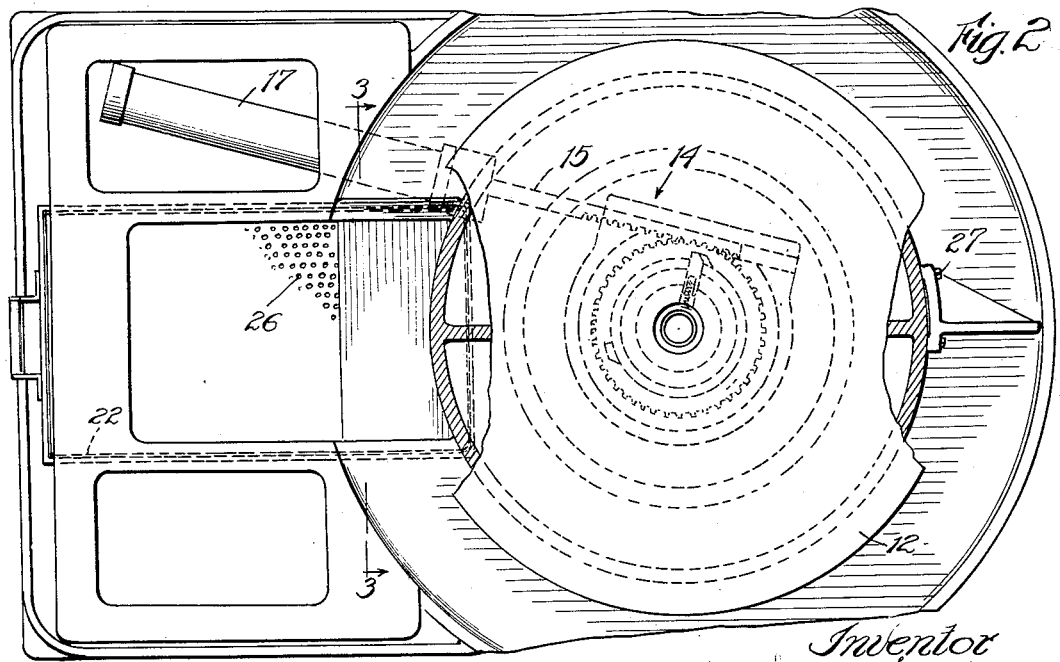
Inventor
Walter M. Fairbairn,
By Chindahl, Parker & Carlson
Attys Patented July 11, 1933

1,917,831

UNITED STATES PATENT OFFICE

WALTER M. FAIRBAIRN, OF ROCKFORD, ILLINOIS, ASSIGNOR TO BARNES DRILL COMPANY, OF ROCKFORD, ILLINOIS, A CORPORATION OF ILLINOIS

MACHINE TOOL

Application filed July 24, 1930. Serial No. 470,301.

The invention pertains to a machine tool such as a drilling or tapping machine, and has for its object an improved construction providing for the easy removal of metal cuttings or chips formed in various machining operations.

Machine tools as heretofore constructed have included a trough disposed adjacent the edge of the work table or other support so as to receive chips flowing from the table with the coolant, the latter being drained and returned to a tank or reservoir usually contained in the base of the machine. This arrangement has necessitated a periodic interruption of the operation of the machine for the purpose of removing the chips from the trough.

The object of my invention is attained by the provision of a sweeper member mounted for movement in and along the trough and operable to clear the chips therefrom and discharge them into a removable receptacle in the base of the machine which can readily be removed from time to time by a subordinate attendant.

In the accompanying drawing wherein I have illustrated an exemplary embodiment of the invention:

Figure 1 is a fragmentary vertical sectional view through the lower portion of a drilling or tapping machine.

Fig. 2 is a plan view partially in section of the base of the machine and showing the work table mounted thereon.

Fig. 3 is a fragmentary transverse sectional view taken approximately in the plane of line 3—3 of Fig. 2.

As herein shown the improved machine comprises an elongated hollow base 7 providing in the bottom portion thereof a reservoir 8 for containing the usual supply of coolant. Upon the rear end of the base is mounted a column 9 from which is supported one or more tool spindles 10 carrying cutting tools 11 in superposed relation to a work table 11. The latter is suitably mounted for rotation upon the forward portion of the base 7, and is equipped with suitable work holding devices 13. Rotation of the table to present the work to the cutting tools successively is effected by an indexing mechanism of any preferred character and generally designated by the numeral 14. That herein shown comprises a rack bar 15 having a pawl and ratchet connection with a tubular post 16 depending from the table and rigid therewith. The rack bar 15 is arranged for reciprocation by hydraulic means including a cylinder 17.

For receiving chips and coolant from the peripheral edge of the table 12, an annular trough 18 is constructed at the upper forward side of the base 7. The trough is made of substantial width, approximately U-shaped in form, with a flat bottom; and at a point at the rear side of the table the bottom of the trough has a discharge opening 19. The chips or other cuttings are carried to this opening by means of a sweep member in the form of an arm 20 secured to the table for rotation therewith.

The rear wall of the base 7 has an opening 21 therein through which a receptacle in the form of a pan 22 may be inserted into the base. Said pan is made of substantial length and is slidably supported upon rails 23 formed in the base 7. The inner end of the pan may be inclined upwardly and forwardly so as to underlie the discharge opening 19.

Coolant is drawn from the reservoir 8 in the usual way by means of a pump 24 and discharged through a pipe 25 at a point adjacent the tools 11, and the coolant thus discharged flows off from the table together with the cuttings or chips into the trough 18. The coolant thus is also adapted to pass from the trough through the discharge hole 19, and in order that the coolant may drain from the receptacle 22, the latter has its bottom perforated as at 26.

The sweep arm 20 may be secured to the table in any suitable way as by means of bolts 27 and, while it is shaped so that its lower portion conforms substantially to the shape of the trough, a clearance is provided between the arm and the trough as indicated at 28, so as to avoid the tendency of any chips becoming wedged between the arm and the trough.

It will be apparent that with the construction provided cuttings or chips accruing as a result of the operation of the machine are discharged automatically, as an incident to the rotation of the table, into a conveniently located receptacle permitting drainage of the coolant also flowing from the table. The latter may be removed periodically without interrupting the operation of the machine by a subordinate attendant.

I claim as my invention:

In a machine tool of the class described, a hollow base elongated in a front to rear direction, a circular work table rotatably mounted forwardly of the base, an upright column rising from the rear of the base, a cutting tool supported by the column above the table, an annular trough rigid with the base and disposed below the peripheral edge of the table, a chip sweeping arm secured to the table extending outwardly therefrom and depending into said trough so as to engage and sweep along the trough chips discharged from the table, said base having an opening in one side, and a chip pan inserted through said opening and having a normal position beneath the column, said trough having an opening therein rearwardly of the table to permit the discharge of chips by said arm into said pan.

In testimony whereof, I have hereunto affixed my signature.

WALTER M. FAIRBAIRN.